United States Patent
Sermanet

(10) Patent No.: US 11,580,360 B2
(45) Date of Patent: Feb. 14, 2023

(54) UNSUPERVISED DETECTION OF INTERMEDIATE REINFORCEMENT LEARNING GOALS

(71) Applicant: GOOGLE LLC, Mountain View, CA (US)

(72) Inventor: Pierre Sermanet, Palo Alto, CA (US)

(73) Assignee: Google LLC, Mountain View, CA (US)

(*) Notice: Subject to any disclaimer, the term of this patent is extended or adjusted under 35 U.S.C. 154(b) by 831 days.

(21) Appl. No.: 16/347,651

(22) PCT Filed: Nov. 6, 2017

(86) PCT No.: PCT/US2017/060216
§ 371 (c)(1),
(2) Date: May 6, 2019

(87) PCT Pub. No.: WO2018/085778
PCT Pub. Date: May 11, 2018

(65) Prior Publication Data
US 2019/0332920 A1    Oct. 31, 2019

Related U.S. Application Data

(60) Provisional application No. 62/418,122, filed on Nov. 4, 2016.

(51) Int. Cl.
*G06N 3/045*    (2023.01)
*G06N 3/08*    (2023.01)
(Continued)

(52) U.S. Cl.
CPC ........... *G06N 3/045* (2023.01); *G06F 18/217* (2023.01); *G06F 18/2111* (2023.01); *G06F 18/2132* (2023.01); *G06N 3/08* (2013.01)

(58) Field of Classification Search
CPC ........ G06N 3/0454; G06N 3/08; G06N 3/006; G06K 9/6229; G06K 9/6234; G06K 9/6262
(Continued)

(56) References Cited

U.S. PATENT DOCUMENTS 10,388,274 B1 *  8/2019  Hoffmeister ......... G06N 3/0445
10,810,491 B1 * 10/2020  Xia .......................... G06N 3/08
(Continued)

FOREIGN PATENT DOCUMENTS

CN    106056213 A    10/2016
WO    WO2016025189 A1    2/2016

OTHER PUBLICATIONS

Abbeel et al, "Apprenticeship learning via inverse reinforcement learning" International Conference on Machine Learning, 2004, 8 pages.
(Continued)

*Primary Examiner* — Jerome Grant, II
(74) *Attorney, Agent, or Firm* — Fish & Richardson P.C.

(57) ABSTRACT

Methods, systems, and apparatus, including computer programs encoded on computer storage media, for detecting intermediate reinforcement learning goals. One of the methods includes obtaining a plurality of demonstration sequences, each of the demonstration sequences being a sequence of images of an environment while a respective instance of a reinforcement learning task is being performed; for each demonstration sequence, processing each image in the demonstration sequence through an image processing neural network to determine feature values for a respective set of features for the image; determining, from the demonstration sequences, a partitioning of the reinforcement learning task into a plurality of subtasks, wherein each image in each demonstration sequence is assigned to a
(Continued)

respective subtask of the plurality of subtasks; and determining, from the feature values for the images in the demonstration sequences, a respective set of discriminative features for each of the plurality of subtasks.

20 Claims, 3 Drawing Sheets

(51) Int. Cl.
    *G06F 18/21*       (2023.01)
    *G06F 18/2111*    (2023.01)
    *G06F 18/2132*    (2023.01)

(58) Field of Classification Search
    USPC .......................................................... 706/31
    See application file for complete search history.

(56) References Cited

U.S. PATENT DOCUMENTS

| | | | | |
|---|---|---|---|---|
| 2015/0100530 | A1* | 4/2015 | Mnih | A63F 13/67 706/25 |
| 2016/0048741 | A1* | 2/2016 | Nguyen | G06V 20/52 382/155 |
| 2016/0292568 | A1 | 10/2016 | Schaul et al. | |
| 2017/0372225 | A1* | 12/2017 | Foresti | G06Q 30/02 |
| 2018/0075346 | A1* | 3/2018 | Pantazi | G06N 3/088 |
| 2018/0285700 | A1* | 10/2018 | Stoop | G06V 10/768 |

OTHER PUBLICATIONS

Argali et al, "A survey of robot learning from demonstration" Robotics and Autonomous Systems, 2009, 28 pages.
Asfour et al, "Imitation learning of dual-arm manipulation tasks in humanoid robots" International Journal of Humanoid Robotics, 2008, 20 pages.
Ashley Edwards et al, "Perceptual Reward Functions", arxiv.org, Cornell University Library, 201 Olin Library Cornell University Ithaca, NY 14853, Aug. 12, 2016 (Aug. 12, 2016), VP080719845, Section 3.
Boularias et al, "Relative entropy inverse reinforcement learning" Proceedings of the 14th International Conference on Artificial Intelligence and Statistics, 2011, 8 pages.
Byravan et al, "Se3-nets: Learning rigid body motion using deep neural networks" ICRA, 2017, 8 pages.
Calinon et al, "Incremental learning of gestures by imitation in a humanoid robot" HRI, 2007, 8 pages.
Calinon, "Robot programming by demonstration" Springer Handbook of Robotics, 2008, 24 pages.
Chebotar et al, "Path integral guided policy search" IEEE International Conference on Robotics and Automation, Jun. 2017, 8 pages.
Deng et al, "ImageNet: A Large-Scale Hierachical Image Database" CVPR, 2009, 8 pages.
Finn et al, "A connection between generative adversarial networks, inverse reinforcement learning , and energy-based models" arXiv, Nov. 2016, 10 pages.
Finn et al, "Deep spatial autoencoders for visuomotor learning" arXiv, Oct. 2015, 9 pages.
Finn et al, "Guided cost learning: Deep inverse optimal control via policy optimization" arXiv, May 2016, 13 pages.
Joulin et al, "Efficient image and video co-localization with frankwolfe algorithm" ECCV, 2014, 17 pages.
Kalakrishnan et al, "Inverse reinforcement learning with pi2" Semantic Scholar, 2010, 2 pages.
Kroemer et al, "Learning to predict phases of manipulation tasks as hidden states" Robotics and Automation (ICRA), 2014, 6 pages.
Michini et al, "Scalable reward learning from demonstration" ICRA, 2013, 7 pages.
Murali Adithyavairavan et al, "TSC-DL: Unsupervised trajectory segmentation of multi-modal surgical demonstrations with Deep Learning", 2016 IEEE International Conference on Robotics and Automation (ICRA), IEEE, May 16, 2016 (May 16, 2016), pp. 4150-4157, XP032908630, DOI: 10.1109/ICRA.2016.7487607 [retrieved on Jun. 8, 2016] Sections II-IV and VI.
Ng et al, "Algorithms for inverse reinforcement learning" ICML, 2000, 8 pages.
Niekum et al, "Learning grounded finite-state representations from unstructured demonstrations" The International Journal of Robotics Research, 2015, 45 pages.
PCT International Preliminary Report on Patentability in International Application No. PCT/US2017/060216, dated May 16, 2019, 11 pages.
PCT International Search Report and Written Opinion in International Application No. PCT/US2017/060216, dated Feb. 16, 2018, 17 pages.
Peters et al, "Relative entropy policy search" Association for the Advancement of Artificial Intelligence, 2010, 6 pages.
Pierre Sermanet et al, "Unsupervised Perceptual Rewards for Imitation Learning, Jun. 12, 2017 (Jun. 12, 2017), XP055449020, Retrieved from the Internet" URL: https://arxiv.org/pdf/1612.06699.pdf [retrieved on Feb. 7, 2018] Sections I-III.
Pinto et al, "Supersizing self-supervision: Learning to grasp from 50k tries and 700 robot hours" IEEE International Conference on Robotics and Automation (ICRA), May 2016, 8 pages.
Prieur et al, "Modeling and planning high-level in hand manipulation actions from human knowledge and active learning from demonstration" IEEE International Conference on Intelligent Robots and Systems, Oct. 2012, 7 pages.
Ramachandran et al, "Bayesian inverse reinforcement learning" IJCAI, 2017, 6 pages.
Ranchod et al, "Nonparametric bayesian reward segmentation for skill discovery using inverse reinforcement learning" IROS, 2015, 7 pages.
Ratliff et al, "Maximum margin planning" International Conference on Machine Learning, 2006, 8 pages.
Sanjay Krishnan et al, "HIRL: Hierarchical Inverse Reinforcement Learning for Long-Horizon Tasks with Delayed Rewards", arxiv.org, Cornell University Library, 201 Olin Library Cornell University Ithaca, NY 14853, Apr. 22, 2016 (Apr. 22, 2016), XP080697161, Sections III-VI.
Sascha Lange et al, "Autonomous reinforcement learning on raw visual input data in a real world application", Neural Networks (IJCNN), The 2012 International Joint Conference on, IEEE, Jun. 10, 2012 (Jun. 10, 2012), pp. 1-8, XP032210517, DOI: 10.1109/IJCNN.2012.6252823 ISBN: 978-1-4673-1488-6 p. 2; figures 3,4.
Sung et al, "Robobarista: Object part based transfer of manipulation trajectories from crowd-sourcing in 3D pointclouds" arXiv, Sep. 201, 16 pages.
Szegedy et al, "Rethinking the inception architecture for computer vision" CVPR, 2016, 9 pages.
Theodorou et al, "A generalized path integral control approach to reinforcement learning" Journal of Machine Learning Research, Nov. 2010, 45 pages.
Walter et al, "Embed to control: A locally linear latent dynamics model for control from raw images" arXiv, Nov. 2015, 18 pages.
Wrede et al, "A user study on kinesthetic teaching of redundant robots in task and configuration space" Journal of Human-Robot Interaction, 2013, 26 pages.
Wulfmeier et al, "Watch This: Scalable Cost-Function Learning for Path Planning in Urban Environments" arXiv, Jul. 2016, 8 pages.
Yuan et al, "A formal study of shot boundary detection" IEEE Transactions on Circuits on Systems for Video Technology, Feb. 2007, 19 pages.
Ziebart et al, "Maximum entropy inverse reinforcement learning" Proceedings of the Twenty-Third AAAI Conference on Artificial Intelligence, 2008, 6 pages.
EP Office Action in European Application No. 17801215.9, dated Nov. 16, 2021, 11 pages.
Lillicrap et al., "Continuous control with deep reinforcement learning," arXiv, Feb. 29, 2016, 14 pages.

(56) References Cited

OTHER PUBLICATIONS

Office Action in Chinese Appln. No. 201780074215.X, dated Dec. 1, 2022, 15 pages (with English Translation).

* cited by examiner

UNSUPERVISED DETECTION OF INTERMEDIATE REINFORCEMENT LEARNING GOALS

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes how a system implemented as one or more computers in one or more locations can process demonstration sequences to determine features that are discriminative for each of multiple subtasks of a reinforcement learning task to be performed by an agent interacting with an environment. The system can then use the discriminative features to generate rewards to train the agent to perform the reinforcement learning task.

Particular embodiments of the subject matter described in this specification can be implemented so as to realize one or more of the following advantages. The described systems can partition a reinforcement learning task into subtasks and thereby detect intermediate goals in an unsupervised manner, i.e., directly from a video or other sequence of images of a demonstrator performing the task and without any explicit specification of sub-goals. More specifically, the system can determine the partitioning from a very small number of task demonstrations, e.g., from less than twenty demonstration sequences. The system can then use the generated partitioning to generate a reward function for use in training a reinforcement learning agent to perform the task. Thus, using the described techniques, reward functions which are dense and smooth can be generated in an unsupervised manner and can be used to effectively train a reinforcement learning agent to perform a complex task solely from a small number of unlabeled demonstration images. Alternatively, the reward functions can be used to augment an existing reward signal, e.g., a manually designed signal, thereby speeding up the training of the reinforcement learning agent, improving the performance of the trained reinforcement learning agent, or both. Because a given reinforcement learning task likely has implicit sub-goals and steps that comprise more complex behaviors, extracting such sub-goals as described in this specification can allow the agent to make maximal use of information contained in a demonstration during training without requiring costly and often infeasible labelling of the demonstration data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes how a system implemented as one or more computers in one or more locations can partition a reinforcement learning task to be performed by an agent into subtasks using demonstration sequences, determine features that are discriminative for each of the subtasks, and then use those discriminative features to generate rewards during the training of the agent.

Figure 1:
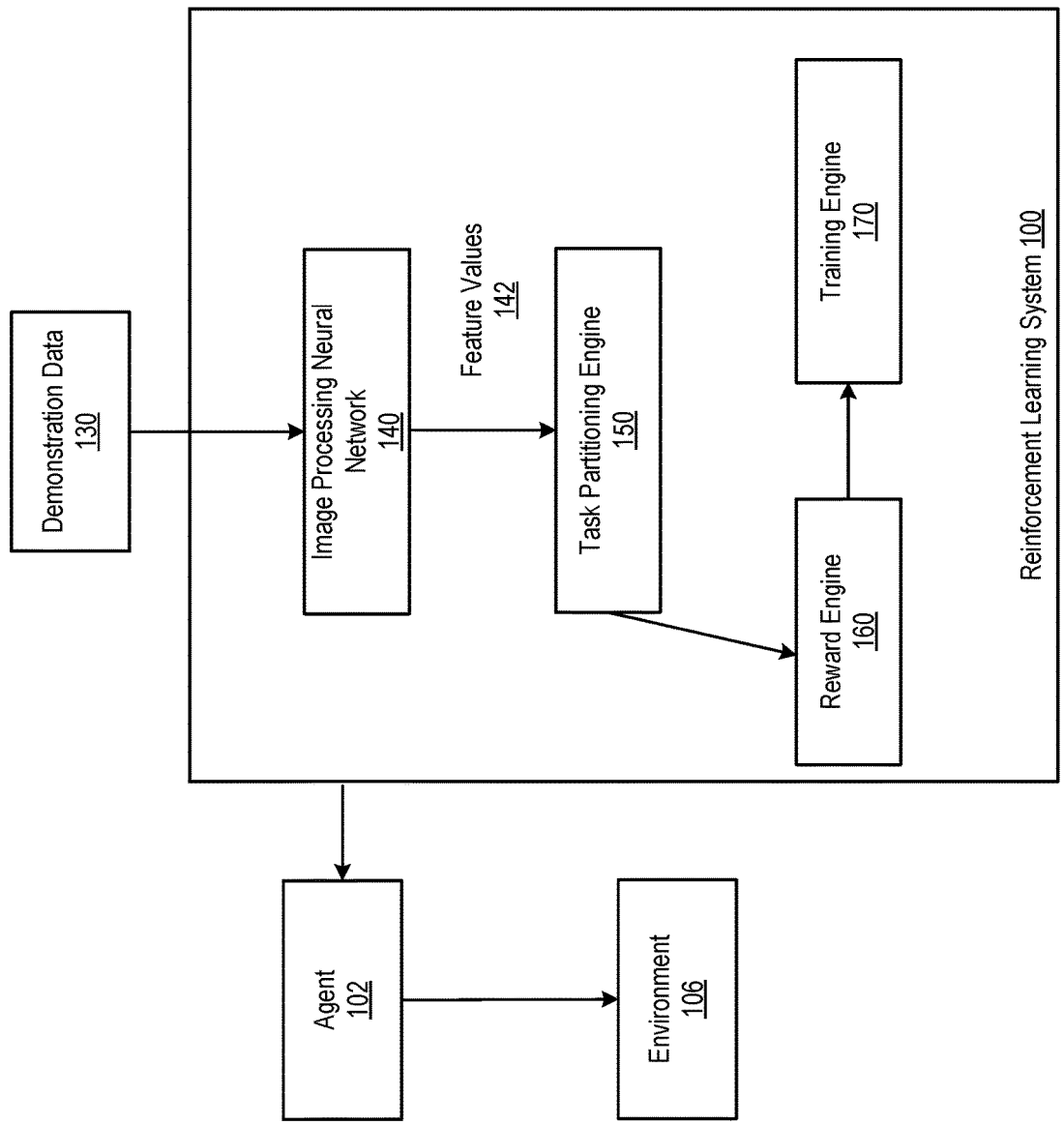
FIG. 1 shows an example reinforcement learning system.

FIG. 1 shows an example reinforcement learning system 100. The reinforcement learning system 100 is an example of a system implemented as computer programs on one or more computers in one or more locations, in which the systems, components, and techniques described below can be implemented.

The reinforcement learning system 100 is a system that trains a reinforcement learning agent 102 to interact with an environment 106 to perform a reinforcement learning task using demonstration data 130 of the task being performed by a demonstrator.

Generally, the environment 106 is a real-world environment and the reinforcement learning agent 102 is a mechanical agent interacting with the environment 102. For example, the agent 102 may be a robot 102 that interacts with the environment to perform the reinforcement learning task. Examples of tasks that the agent 102 can perform include moving a specified object from one location to another in the environment, locating a specified object in the environment, or navigating from one location to another in the environment.

The reinforcement learning system 100 trains the reinforcement learning agent 102 by training a policy for controlling the agent 102, i.e., a policy that defines actions to be performed by the agent 102 while the agent 102 attempts to perform the reinforcement learning task.

For example, the policy may be a neural network that receives an observation characterizing the state of the environment, e.g., an image of the environment as captured by the agent 102, and generates a policy output that defines the action to be performed by the agent 102 in response to the observation, e.g., that generates parameters of a distribution over possible joint torques for the joints of the agent 102.

As another example, the policy may be a simpler controller, e.g., a linear-Gaussian parameterization of the policy, that takes as input a lower-dimensional state representation, e.g., the joint angles and angular velocities of the agent 102, and outputs the parameters of a distribution over possible joint torques for the agent 102.

In particular, the demonstration data 130 used by the system 100 to train the agent 102 includes multiple demonstration sequences. A demonstration sequence is a sequence of images of the environment that are captured while an instance of the reinforcement learning task is being performed by a demonstrator, e.g., another mechanical agent or a human demonstrator.

To use the demonstration sequences to train the agent 102, the system 100 processes each image in the demonstration sequence through an image processing neural network 140 to determine feature values 142 for a respective set of features for the image.

Generally, the image processing neural network 140 is a neural network that has been pre-trained on an image processing task, e.g., an object detection or image classification task, without further modification of the values of the parameters of the image processing neural network 140. For example, the image processing neural network 140 may be an Inception image classification neural network that has been pre-trained on an image classification data set. Such a neural network is described in more detail in Christian Szegedy, Vincent Vanhoucke, Sergey Ioffe, Jonathon Shlens, and Zbigniew Wojna. Rethinking the inception architecture for computer vision. CVPR, 2016.

For each image, the system 100 determines the feature values for the image from activations generated by one or more of the hidden layers of the network 140 during the processing of the image. For example, the feature values may be the output of a predetermined one of the hidden layers of the neural network 140. As another example, the feature values may include outputs of multiple hidden layers of the neural network 140, e.g., each layer after a predetermined layer in the network.

A task partitioning engine 150 determines, from the feature values 142 for the images in the demonstration sequences, a partitioning of the reinforcement learning task into subtasks such that each image in each demonstration sequence is assigned to a respective subtask. Thus, completing the reinforcement learning task can be decomposed into accomplishing multiple intermediate goals, i.e., completing each of the subtasks in the partitioning. The task partitioning engine 150 can make this determination based on the images in the demonstration sequences and without any external labeling of the subtasks, i.e., in an unsupervised manner. Partitioning the reinforcement learning task into subtasks using the demonstration images is described in more detail below with reference to FIG. 2.

The task partitioning engine 150 then determines, from the feature values for the images in the demonstration sequences, a respective set of discriminative features for each of the subtasks. The discriminative features for a given subtask are features that are highly discriminative features of a specific goal to be achieved in the subtask, i.e., relative to the other subtasks in the partition, while remaining invariant to unrelated variation (e.g., lighting, color, and viewpoint). Determining discriminative features for each of the subtasks is also described in more detail below with reference to FIG. 2.

Once the task partitioning engine 150 has determined the discriminative features for each of the subtasks, a reward engine 160 can use this information to generate rewards for the agent 102 based on feature values for the discriminative features for images of the environment 160 generated during the training of the agent 102, i.e., to reflect the agent's progress in completing one or more of the subtasks. This reward can then be used to improve the training of the agent, i.e., to speed up the training, to improve the performance of the agent on the task once trained, or both.

In particular, a training engine 170 trains the agent 102, i.e., trains the policy, using a reinforcement learning technique. In reinforcement learning, a policy is learned that, when used to select actions to be performed by an agent, maximizes a measure of cumulative reward received by the agent as a result of interacting with the environment. For example, the measure can be the time-discounted sum of rewards received during the performance of the task. Generally, rewards are numeric values that represent how well the agent is performing a given task and are used in the reinforcement learning technique to adjust the policy to improve the performance of the agent on the task.

The training engine 170 can use any appropriate reward-based reinforcement learning technique to train the agent 102. For example, when the policy is a deep neural network, the engine can use a deep deterministic policy gradient (DDPG) technique. Such a technique is described in more detail in Lillicrap, Timothy, et al, Continuous control with Deep Reinforcement Learning, ICLR 2016. As another example, when the policy is a simpler controller, the engine can use a path-integral based technique. An example of such a technique is described in Yevgen Chebotar, Mrinal Kalakrishnan, Ali Yahya, Adrian Li, Stefan Schaal, and Sergey Levine. Path integral guided policy search.

In some cases, the reward that is generated by the reward engine 160 is the only reward that the training engine 170 uses to train the agent 102 using the reinforcement learning technique. In other cases, the training engine 170 may also receive other rewards from an external source and combine the rewards generated by the reward engine 160 with the external rewards, e.g., as a weighted average or a weighted sum, and use the total reward as the reward for the reinforcement learning technique.

Figure 2:
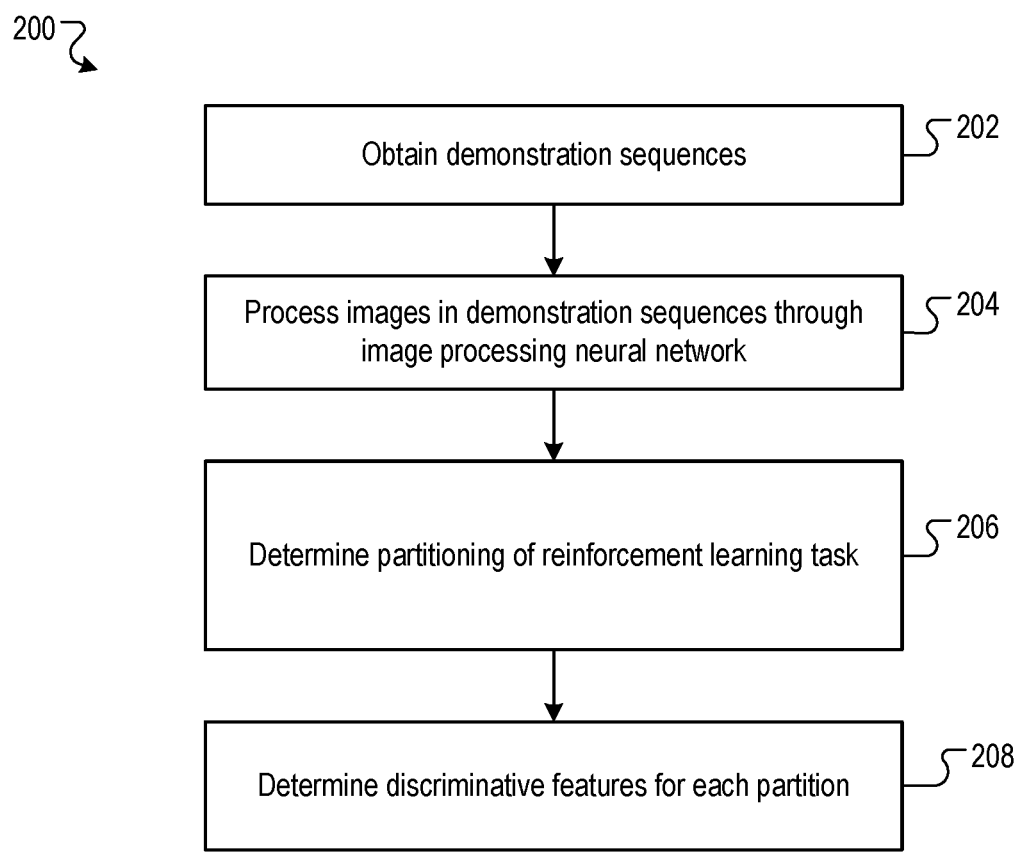
FIG. 2 is a flow diagram of an example process for partitioning a reinforcement learning task into subtasks.

FIG. 2 is a flow diagram of an example process 200 for partitioning a reinforcement learning task into subtasks. For convenience, the process 200 will be described as being performed by a system of one or more computers located in one or more locations. For example, a reinforcement learning system, e.g., the reinforcement learning system 100 of FIG. 1, appropriately programmed, can perform the process 200.

The system obtains multiple demonstration sequences (step 202). As described above, each demonstration sequence is a sequence of images of a demonstrator performing the reinforcement learning task that the agent will be trained to perform. In some cases, certain characteristics of the tasks performed by the demonstrator or demonstrators differ between the various demonstration sequences and from the task that the agent will be required to perform. For example, the initial state of the task may be different between some or all of the demonstration sequences.

The system processes each image in each demonstration sequence through an image processing neural network to determine, for each image, feature values for a respective set of features for the image (step 204). In particular, the system determines the feature values for a given image from the activations generated by one or more of the hidden layers of the image processing neural network. For example, the feature values may be the activations of a predetermined hidden layer of the neural network or the activations of multiple predetermined hidden layers of the neural network.

The system determines a partitioning of the reinforcement task into multiple subtasks (step 206), with each image in each demonstration sequence being assigned to a respective subtask of the multiple subtasks.

Generally, the system partitions the reinforcement learning task such that each image in each partition is abstractly similar to each other image in the partition. In some cases, the system accomplishes this by selecting a partitioning that (approximately) minimizes average feature value variance between images within each partition.

In some implementations, the system selects the partitioning that minimizes average feature value variance by recursively adjusting the partitioning to determine the partitioning that minimizes the average feature value variance starting from a predetermined minimum subtask size and that satisfies some criteria, e.g., that each subtask includes at least a predetermined minimum number of images and that the total number of partitions is fixed to a predetermined number.

In some other implementations, the system selects the partitioning that approximately minimizes average feature value variance by first splitting the entire sequence in two and then recursively splitting each new sequence in two as described above until the total number of partitions has been reached.

In some implementations, the system partitions each demonstration sequence individually and then aligns the partitioning prior to the selection of the discriminative features. In some other implementations, the system jointly partitions the demonstration sequences, with the recursion taking into consideration the feature values in all of the demonstration sequences.

The system determines, from the feature values for the images in the demonstration sequences, a respective set of discriminative features for each of the plurality of subtasks (step 208). As described above, the discriminative features for a given subtask are features that are highly discriminative features of a specific goal to be achieved in the subtask while remaining invariant to unrelated variation (e.g., lighting, color, and viewpoint).

In some implementations, to determine the discriminative features for a given subtask, the system processes the features using a classifier, i.e., a deep or a shallow classifier, that is configured to generate an output identifying the discriminative features of a given subtask.

In some other implementations, the system first normalizes the feature values of the feature across the images in the demonstration sequences to determine a normalized feature value of the feature for each image, i.e., by subtracting the mean of the feature for all of the demonstration images and dividing by the standard deviation of the feature for all of the demonstration images.

The system then computes, for each subtask, distribution statistics, e.g., a mean and a standard deviation, for normalized feature values of the feature for images that are not in the subtask and the same distribution statistics for normalized feature values of the feature for images that are in the subtask.

For a given subtask, the system can then determine a score for each feature for the subtask from the distribution statistics for the normalized feature values of the feature for images that are not in the subtask and the distribution statistics for the normalized feature values of the feature for images that are in the subtask. For example, the score z for a feature i for a given subtask can satisfy:

$$z_i = \alpha |\mu_i^+ - \mu_i^-| - (\sigma_i^+ - \sigma_i^-),$$

where $\alpha$ is a predetermined positive constant, $\mu_i^+$ is the average feature value for the feature for the images in the subtask, $\mu_i^-$ is the average feature value for the feature for the images not in the subtask, $\sigma_i^+$ is the standard deviation of the feature values for the feature for the images in the subtask, and $\sigma_i^-$ is the standard deviation for the feature for the images not in the subtask.

The system can then select, for each subtask, a fixed number of highest-scoring features as the discriminative features for the subtask.

Figure 3:
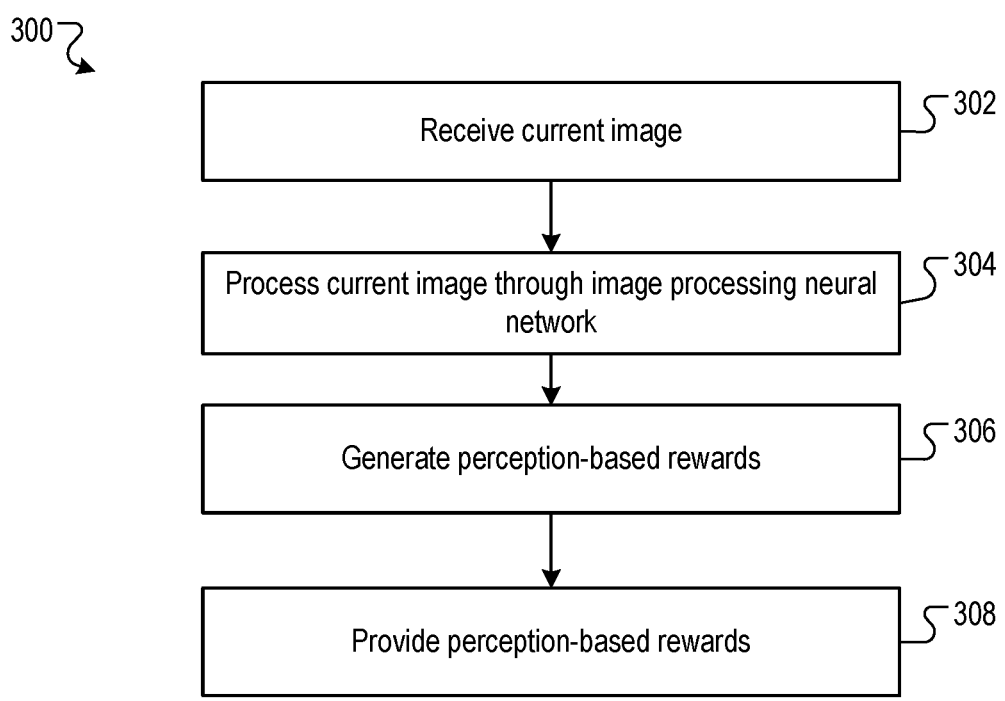
FIG. 3 is a flow diagram of an example process for generating a reward.

FIG. 3 is a flow diagram of an example process 300 for generating a reward for a reinforcement learning technique. For convenience, the process 300 will be described as being performed by a system of one or more computers located in one or more locations. For example, a reinforcement learning system, e.g., the reinforcement learning system 100 of FIG. 1, appropriately programmed, can perform the process 300.

The system can repeatedly perform the process 300 during the training of the reinforcement agent to provide rewards for use in the training of the agent.

The system receives a current image characterizing a current state of the environment (step 302). Generally, the image is an image of the agent performing the task during the training of the agent.

The system processes the current image through the image processing neural network to determine feature values for the current image (step 304). The system uses the same intermediate outputs of the image processing neural network to generate the feature values as were used for the demonstration images, i.e., uses the outputs of the same one or more hidden layers of the neural network as the feature values.

The system generates, for each of one or more of the subtasks, a respective perception-based reward from the feature values of the features for the subtask (step 306). Generally, the reward for a given subtask is based on how similar the feature values for the discriminative features of the current image are to the feature values of the discriminative features for the demonstration images that are in the given subtask. In some implementations, the reward for the given subtask is based on a comparison between the feature values for the current image and the average of the feature values for the demonstration images in the subtask. For example, in some implementations the reward $R_g(s_t)$ for a subtask g for the current image $s_t$ satisfies:

$$R_g(s_t) = \frac{1}{n} \sum_j^M \frac{(s_{ijt} - \mu_{ijt}^+)^2}{(\sigma_{ijt}^+)^2},$$

where n is the total number of subtasks, j ranges over the M discriminative features of the subtask g, $s_{ijt}$ is the feature value for feature j of the current image, $\mu_{ijt}^+$ is the average of the feature values for the feature j of the demonstration images in the subtask, and $\sigma_{ijt}^+$ is the standard deviation of the feature values for the feature j of the demonstration images in the subtask.

In some other implementations, the system instead processes the feature values (either for the discriminative features or for all of the features) for the current image using a classifier that has been trained to receive the feature values and to generate the reward for the subtask. That is, the system maintains a respective classifier for each subtask and processes the feature values through each of the classifiers to determine the rewards for each of the subtasks. The classifier can be a linear layer that has been trained on the demonstration images to receive feature values and to map the received feature values to a single reward score.

The system provides the one or more perception-based rewards for use in training the agent to perform the reinforcement learning task (step 308). In particular, because reinforcement learning techniques typically train the agent using a single reward received at each training time step, the system combines the perception-based rewards and uses the combined reward in the training of the agent, i.e., as the only reward or in combination with another reward derived from a different source. In some implementations, the combined reward partially rewards intermediate steps but emphasizes later rewards, i.e., because successfully completing later subtasks is more indicative of successfully completing the task. For example, in some implementations the combined reward R(a) for a given set of feature values a satisfies:

$$R(a) = \sum_{i=2}^{n} R_i(a) * 2^{(i-1)},$$

where n is the total number of sub-tasks and $R_i(a)$ is the reward for subtask i. In this example, the first sub-task is ignored because it is assumed to be the initial starting state in the demonstration sequences.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining, by a computing system, a plurality of demonstration sequences, each of the demonstration sequences being a sequence of images of an environment while a respective instance of a reinforcement learning task is being performed;
   for each demonstration sequence, processing, by the computing system, each image in the demonstration sequence through an image processing neural network comprising a plurality of hidden layers to determine feature values for a respective set of features for the image from activations generated by one or more of the hidden layers;
   determining, by the computing system and from the demonstration sequences, a partitioning of the reinforcement learning task into a plurality of subtasks, wherein each image in each demonstration sequence is assigned to a respective subtask of the plurality of subtasks;
   determining, by the computing system and from the feature values for the images in the demonstration sequences, a respective set of discriminative features for each of the plurality of subtasks; and
   during training of an agent to perform the reinforcement learning task, performing:
   receiving a current image characterizing a current state of the environment;
   processing the current image through the image processing neural network to determine feature values for the respective set of features for the current image;
   generating, for each of one or more of the subtasks, a respective perception-based reward from the feature values of the current image for the discriminative features for the subtask; and providing the one or more perception-based rewards for use in training the agent to perform the reinforcement learning task.

2. The method of claim 1, wherein determining, from the feature values for the images in the demonstration sequences, a respective set of discriminative features comprises, for each subtask:
processing the feature values for the images in the demonstration sequences that are in the subtask using a trained classifier to determine the discriminative features for the task.

3. The method of claim 1, wherein determining, from the feature values for the images in the demonstration sequences, a respective set of discriminative features comprises, for each feature:
normalizing the feature values of the feature across the images in the demonstration sequences to determine a normalized feature value of the feature for each image;
for each subtask:
computing distribution statistics for normalized feature values of the feature for images that are not in the subtask;
computing distribution statistics for normalized feature values of the feature for images that are in the subtask; and
determining a score for the feature for the subtask from the distribution statistics for the normalized feature values of the feature for images that are not in the subtask and the distribution statistics for the normalized feature values of the feature for images that are in the subtask.

4. The method of claim 3, further comprising, for each subtask, selecting a plurality of highest-scoring features as the discriminative features for the subtask.

5. The method of claim 1, wherein determining, from the demonstration sequences, a partitioning of the reinforcement learning task into a plurality of subtasks comprises:
partitioning the reinforcement task such that each image in each partition is abstractly similar to each other image in the partition.

6. The method of claim 1, wherein determining, from the demonstration sequences, a partitioning of the reinforcement learning task into a plurality of subtasks comprises:
selecting a partitioning that minimizes average feature value variance between images within each partition.

7. The method of claim 6, wherein selecting a partitioning that minimizes average feature value variance between images within each partition comprises:
recursively adjusting the partitioning to determine the partitioning that minimizes the average feature value variance.

8. A system comprising one or more computers and one or more storage devices storing instructions that when executed by the one or more computers cause the one or more computers to perform operations comprising:
obtaining, by a computing system, a plurality of demonstration sequences, each of the demonstration sequences being a sequence of images of an environment while a respective instance of a reinforcement learning task is being performed;
for each demonstration sequence, processing, by the computing system, each image in the demonstration sequence through an image processing neural network comprising a plurality of hidden layers to determine feature values for a respective set of features for the image from activations generated by one or more of the hidden layers;
determining, by the computing system and from the demonstration sequences, a partitioning of the reinforcement learning task into a plurality of subtasks, wherein each image in each demonstration sequence is assigned to a respective subtask of the plurality of subtasks; and
determining, by the computing system and from the feature values for the images in the demonstration sequences, a respective set of discriminative features for each of the plurality of subtasks; and
during training of an agent to perform the reinforcement learning task, performing:
receiving a current image characterizing a current state of the environment;
processing the current image through the image processing neural network to determine feature values for the respective set of features for the current image;
generating, for each of one or more of the subtasks, a respective perception-based reward from the feature values of the current image for the discriminative features for the subtask; and
providing the one or more perception-based rewards for use in training the agent to perform the reinforcement learning task.

9. The system of claim 8, wherein determining, from the feature values for the images in the demonstration sequences, a respective set of discriminative features comprises, for each subtask:
processing the feature values for the images in the demonstration sequences that are in the subtask using a trained classifier to determine the discriminative features for the task.

10. The system of claim 8, wherein determining, from the feature values for the images in the demonstration sequences, a respective set of discriminative features comprises, for each feature:
normalizing the feature values of the feature across the images in the demonstration sequences to determine a normalized feature value of the feature for each image;
for each subtask:
computing distribution statistics for normalized feature values of the feature for images that are not in the subtask;
computing distribution statistics for normalized feature values of the feature for images that are in the subtask; and
determining a score for the feature for the subtask from the distribution statistics for the normalized feature values of the feature for images that are not in the subtask and the distribution statistics for the normalized feature values of the feature for images that are in the subtask.

11. The system of claim 10, the operations further comprising, for each subtask, selecting a plurality of highest-scoring features as the discriminative features for the subtask.

12. The system of claim 8, wherein determining, from the demonstration sequences, a partitioning of the reinforcement learning task into a plurality of subtasks comprises:
partitioning the reinforcement task such that each image in each partition is abstractly similar to each other image in the partition.

13. The system of claim 8, wherein determining, from the demonstration sequences, a partitioning of the reinforcement learning task into a plurality of subtasks comprises:

selecting a partitioning that minimizes average feature value variance between images within each partition.

14. The system of claim 13, wherein selecting a partitioning that minimizes average feature value variance between images within each partition comprises:
recursively adjusting the partitioning to determine the partitioning that minimizes the average feature value variance.

15. One or more non-transitory computer-readable storage media storing instructions that when executed by one or more computers cause the one or more computers to perform operations comprising:
obtaining, by a computing system, a plurality of demonstration sequences, each of the demonstration sequences being a sequence of images of an environment while a respective instance of a reinforcement learning task is being performed;
for each demonstration sequence, processing, by the computing system, each image in the demonstration sequence through an image processing neural network comprising a plurality of hidden layers to determine feature values for a respective set of features for the image from activations generated by one or more of the hidden layers;
determining, by the computing system and from the demonstration sequences, a partitioning of the reinforcement learning task into a plurality of subtasks, wherein each image in each demonstration sequence is assigned to a respective subtask of the plurality of subtasks; and
determining, by the computing system and from the feature values for the images in the demonstration sequences, a respective set of discriminative features for each of the plurality of subtasks; and
during training of an agent to perform the reinforcement learning task, performing:
receiving a current image characterizing a current state of the environment;
processing the current image through the image processing neural network to determine feature values for the respective set of features for the current image;
generating, for each of one or more of the subtasks, a respective perception-based reward from the feature values of the current image for the discriminative features for the subtask; and
providing the one or more perception-based rewards for use in training the agent to perform the reinforcement learning task.

16. The computer-readable storage media of claim 15, wherein determining, from the feature values for the images in the demonstration sequences, a respective set of discriminative features comprises, for each subtask:
processing the feature values for the images in the demonstration sequences that are in the subtask using a trained classifier to determine the discriminative features for the task.

17. The computer-readable storage media of claim 15, wherein determining, from the feature values for the images in the demonstration sequences, a respective set of discriminative features comprises, for each feature:
normalizing the feature values of the feature across the images in the demonstration sequences to determine a normalized feature value of the feature for each image;
for each subtask:
computing distribution statistics for normalized feature values of the feature for images that are not in the subtask;
computing distribution statistics for normalized feature values of the feature for images that are in the subtask; and
determining a score for the feature for the subtask from the distribution statistics for the normalized feature values of the feature for images that are not in the subtask and the distribution statistics for the normalized feature values of the feature for images that are in the subtask.

18. A method comprising:
obtaining, by a computing system, a plurality of demonstration sequences, each of the demonstration sequences being a sequence of images of an environment while a respective instance of a reinforcement learning task is being performed;
for each demonstration sequence, processing, by the computing system, each image in the demonstration sequence through an image processing neural network comprising a plurality of hidden layers to determine feature values for a respective set of features for the image from activations generated by one or more of the hidden layers;
determining, by the computing system and from the demonstration sequences, a partitioning of the reinforcement learning task into a plurality of subtasks, wherein each image in each demonstration sequence is assigned to a respective subtask of the plurality of subtasks; and
determining, by the computing system and from the feature values for the images in the demonstration sequences, a respective set of discriminative features for each of the plurality of subtasks, comprising, for each feature:
normalizing the feature values of the feature across the images in the demonstration sequences to determine a normalized feature value of the feature for each image; and
for each subtask:
computing distribution statistics for normalized feature values of the feature for images that are not in the subtask;
computing distribution statistics for normalized feature values of the feature for images that are in the subtask; and
determining a score for the feature for the subtask from the distribution statistics for the normalized feature values of the feature for images that are not in the subtask and the distribution statistics for the normalized feature values of the feature for images that are in the subtask.

19. A method comprising:
obtaining, by a computing system, a plurality of demonstration sequences, each of the demonstration sequences being a sequence of images of an environment while a respective instance of a reinforcement learning task is being performed;
for each demonstration sequence, processing, by the computing system, each image in the demonstration sequence through an image processing neural network comprising a plurality of hidden layers to determine feature values for a respective set of features for the image from activations generated by one or more of the hidden layers;

determining, by the computing system and from the demonstration sequences, a partitioning of the reinforcement learning task into a plurality of subtasks, wherein each image in each demonstration sequence is assigned to a respective subtask of the plurality of subtasks, and wherein determining the partitioning of the reinforcement learning task comprises selecting a partitioning that minimizes average feature value variance between images within each partition; and determining, by the computing system and from the feature values for the images in the demonstration sequences, a respective set of discriminative features for each of the plurality of subtasks.

20. A system comprising one or more computers and one or more storage devices storing instructions that when executed by the one or more computers cause the one or more computers to perform operations comprising:

obtaining, by a computing system, a plurality of demonstration sequences, each of the demonstration sequences being a sequence of images of an environment while a respective instance of a reinforcement learning task is being performed;

for each demonstration sequence, processing, by the computing system, each image in the demonstration sequence through an image processing neural network comprising a plurality of hidden layers to determine feature values for a respective set of features for the image from activations generated by one or more of the hidden layers;

determining, by the computing system and from the demonstration sequences, a partitioning of the reinforcement learning task into a plurality of subtasks, wherein each image in each demonstration sequence is assigned to a respective subtask of the plurality of subtasks, and wherein determining the partitioning of the reinforcement learning task comprises selecting a partitioning that minimizes average feature value variance between images within each partition; and determining, by the computing system and from the feature values for the images in the demonstration sequences, a respective set of discriminative features for each of the plurality of subtasks.

* * * * *

UNITED STATES PATENT AND TRADEMARK OFFICE
CERTIFICATE OF CORRECTION

| | | |
|---|---|---|
| PATENT NO. | : 11,580,360 B2 | Page 1 of 1 |
| APPLICATION NO. | : 16/347651 | |
| DATED | : February 14, 2023 | |
| INVENTOR(S) | : Sermanet | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 914 days.

Signed and Sealed this
Ninth Day of January, 2024

Katherine Kelly Vidal
*Director of the United States Patent and Trademark Office*